US007983946B1

(12) United States Patent
Cassone et al.

(10) Patent No.: US 7,983,946 B1
(45) Date of Patent: Jul. 19, 2011

(54) SYSTEMS AND METHODS FOR IDENTIFYING HIGH COMPLEXITY PROJECTS

(75) Inventors: Deandra T. Cassone, Overland Park, KS (US); Noel R. Marchbanks, Overland Park, KS (US); Paul R. Sapenaro, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 918 days.

(21) Appl. No.: 11/938,778

(22) Filed: Nov. 12, 2007

(51) Int. Cl.
*G06F 17/50* (2006.01)
(52) U.S. Cl. .................................................. 705/7.36
(58) Field of Classification Search .......... 705/7; 7/7.36
See application file for complete search history.

(56) References Cited

U.S. PATENT DOCUMENTS

| 5,189,606 | A | 2/1993 | Burns et al. |
| 5,798,950 | A | 8/1998 | Fitzgerald |
| 5,815,638 | A | 9/1998 | Lenz et al. |
| 5,918,219 | A | 6/1999 | Isherwood |
| 7,139,999 | B2 | 11/2006 | Bowman-Amuah |
| 7,676,490 | B1 | 3/2010 | Cassone et al. |
| 2002/0174005 | A1 | 11/2002 | Chappel |
| 2004/0054568 | A1 | 3/2004 | Bradley et al. |
| 2004/0111306 | A1 | 6/2004 | Yokota et al. |
| 2004/0186757 | A1* | 9/2004 | Starkey ............................. 705/7 |
| 2004/0249779 | A1 | 12/2004 | Nauck et al. |
| 2005/0065826 | A1 | 3/2005 | Baker et al. |
| 2005/0287503 | A1 | 12/2005 | George |
| 2006/0044307 | A1 | 3/2006 | Song |
| 2006/0235732 | A1 | 10/2006 | Miller et al. |
| 2007/0250377 | A1* | 10/2007 | Hill et al. ......................... 705/11 |
| 2007/0276712 | A1* | 11/2007 | Kolanchery et al. .............. 705/7 |
| 2008/0300946 | A1* | 12/2008 | Clark et al. ....................... 705/8 |
| 2009/0070188 | A1* | 3/2009 | Scott et al. ...................... 705/10 |

OTHER PUBLICATIONS

Sambasivarao, K.V., et al. "Factors for Evaluating Factory Automation Projects—Inferences from an Indian Survey." Work Study, Jul./Aug. 1995, vol. 44, No. 5, p. 16.*
Ustinovichius, Leonas. "Determination of Efficiency of Investments in Construction." International Journal of Strategic Property Management, vol. 8, No. 1, 2004, p. 25.*
Bottani, Eleonora and Antonio Rizzi. "A Fuzzy TOPSIS Methodology to Support Outsourcing of Logistics Services." Supply Chain Management: An International Journal, 11/4 (2006) 294-308.*
Kahraman, Cengiz, et al. "Hierarchical Fuzzy TOPSIS Model for Selection Among Logistics Information Technologies." Journal of Enterprise Information Management, vol. 20, No. 2, 2007, pp. 143-168.*
Alsup, Lance A., et al., Patent Application entitled, "Project Estimator", filed Jul. 21, 2006, U.S. Appl. No. 11/491,203.
Cassone, Deandra T., et al., Patent Application entitled, "Enhanced Project Predictor", filed Feb. 8, 2007, U.S. Appl. No. 11/672,905.
Armour, Phillip, "Ten Unmyths of Project Estimation," Communications of the ACM, Nov. 2002, vol. 45. No. 11.
Berenson, Mark L., et al., "Basic Business Statistics: Concepts and Applications," Upper Saddle River, N.J., Pearson/Prentice Hall, 2005, 8th Edition.

(Continued)

*Primary Examiner* — Susanna M Diaz (57) ABSTRACT

Computer implemented methods and systems are provided for identifying high to high complexity projects. Some method embodiments include defining proposed project data for identified factors, calculating a planning team index for a project associated with the proposed project data, and identifying the project as complex when the planning team indicator falls on one side of a breaking point. The factors are those identified as determinative of project complexity.

18 Claims, 5 Drawing Sheets

OTHER PUBLICATIONS

Briand, Lionel C., et al., "Using Multiple Adaptive Regression Splines to Support Decision Making in Code Inspections," Feb. 28, 2004.

Yoon, K. P., and Hwang, C. L., "Multiple Attribute Decision Making: An Introduction," Sage University Paper series on Quantitative Applications in the Social Sciences, 07-104, 1995, Sage, Thousand Oaks, CA.

Office Action dated Jun. 8, 2010, U.S. Appl. No. 11/491,203, filed Jul. 21, 2006.

Final Office Action dated Oct. 27, 2010, U.S. Appl. No. 11/491,203, filed Jul. 21, 2006.

Advisory Action dated Jan. 6, 2011, U.S. Appl. No. 11/491,203, filed Jul. 21, 2006.

Pre-Interview First Office Action dated Jul. 3, 2008, U.S. Appl. No. 11/467,226, filed Aug. 25, 2006.

First Action Interview—Office Action dated Oct. 27, 2008, U.S. Appl. No. 11/467,226, filed Aug. 25, 2006.

Final Office Action dated Apr. 1, 2009, U.S. Appl. No. 11/467,226, filed Aug. 25, 2006.

Advisory Action dated Jun. 11, 2009, U.S. Appl. No. 11/467,226, filed Aug. 25, 2006.

Notice of Allowance dated Oct. 23, 2009, U.S. Appl. No. 11/467,226, filed Aug. 25, 2006.

Office Action dated Aug. 2, 2010, U.S. Appl. No. 11/672,905, filed Feb. 8, 2007.

Notice of Allowance dated Jan. 13, 2011; U.S. Appl. No. 11/672,905, filed Feb. 8, 2007.

* cited by examiner

| Concept ID | Concept Name | | Weighting Coefficient 502 | 35 | 25 | 15 | 15 | 5 | 5 |
|---|---|---|---|---|---|---|---|---|---|
| | | | Adj. Weighting Coefficient 510 | 35% | 25% | 15% | 15% | 5% | 5% |
| | | | COST | COST | COST | COST | COST | COST | COST |
| | | | Total Cost 336 | Vendor Costs 338 | IT-Billing Impact 340 | Network Impact 342 | Customer Equipment Impact 344 | No. of Impacted Orgs. 346 |
| | | Min | 1 | 1 | 1 | 1 | 1 | 1 |
| E123 | Project X | | 4 | 3 | 1 | 5 | 5 | 5 |
| | | Max | 5 | 5 | 5 | 5 | 5 | 30 |

FIG. 6

| Concept ID | Concept Name | Input Weight 502 | | | | | |
|---|---|---|---|---|---|---|---|
| | | 35 | 25 | 15 | 15 | 5 | 5 |
| | | Adj. Weight 510 | | | | | |
| | | 35% | 25% | 15% | 15% | 5% | 5% |
| | | COST | COST | COST | COST | COST | COST |
| E123 | Project X | 0.0540 | 0.0423 | 0.0289 | 0.0210 | 0.0070 | 0.0016 |
| | | 0.2160 | 0.1268 | 0.1443 | 0.1050 | 0.0350 | 0.0082 |
| | | 0.2700 | 0.2113 | 0.1443 | 0.1050 | 0.0350 | 0.0493 |
| PIS = | | 0.0540 | 0.0423 | 0.0289 | 0.0210 | 0.0070 | 0.0016 |
| NIS = | | 0.2700 | 0.2113 | 0.1443 | 0.1050 | 0.0350 | 0.0493 |

| S* | S- | Abs. Score |
|---|---|---|
| 0.0000 | 0.3141 | 1.0000 |
| 0.2032 | 0.1584 | 0.4380 |
| 0.3141 | 0.0000 | 0.0000 |

US 7,983,946 B1

SYSTEMS AND METHODS FOR IDENTIFYING HIGH COMPLEXITY PROJECTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An organization may use a project development pipeline to organize and optimize the allocation of resources for a stream of developing projects, including new products or services. The project development pipeline may be thought of as a chain of process phases and resources arranged so that the output of each element of the chain flows into the input of the next element in the pipeline. Resources needed to develop projects in the pipeline may include time, money, manpower, materials, energy, space, and equipment. As projects pass through the project development pipeline, they are governed to various degrees to insure that each project is completed on time and within budget.

Managing high to very high complexity projects in the project development pipeline can be difficult. For example, it may be difficult to estimate the amount of manpower needed to execute a particular phase of a high complexity project. In the event that insufficient manpower is allocated, completion of that project phase may occur beyond its intended deadline. Alternatively, additional resources may be allocated in order to meet the deadline, perhaps by diverting those resources from another project in the pipeline. The cost associated with the additional resources may cause the high complexity project to exceed its allocated budget. Furthermore, the diversion of resources away from another project in the pipeline may cause that project to miss its intended deadline and/or exceed its allocated budget.

SUMMARY

In embodiments of the present disclosure, computer implemented methods and computer implemented systems are provided for identifying high to high complexity projects. Some method embodiments include defining proposed project data for one or more factors including at least one of the group consisting of total project cost, total vendor costs, a number of organizations impacted, customer equipment impact, information technology billing impact, and network impact. The proposed project data for each factor includes an input value, a value range, a weighting coefficient, and a scale associated with the value range, where the scale has a minimum limit and a maximum limit. The method embodiments further include converting the input value to a scaled value for each factor and calculating an absolute score for each factor as a function of the scaled value, the minimum scale limit, the maximum scale limit, and the weighting coefficient for the factor, wherein the function is defined using Technique for Order Preference by Similarity to Ideal Solution (TOPSIS) methodology. The method embodiments further include calculating an absolute score for a project associated with the proposed project data as a function of the absolute scores for all factors, comparing the absolute score for the project to a defined breaking point, and identifying the project as complex when the absolute score for the project falls on one side of the breaking point.

Some system embodiments include a first memory that stores planning team indicator software and a processor that executes the planning team indicator software. The planning team indicator software configures the processor to receive project data for identified factors. The identified factors include at least four of the group consisting of total project cost, total vendor costs, a number of organizations impacted, customer equipment impact, information technology billing impact, and network impact. The planning team indicator software further configures the processor to calculate a planning team indicator as a function of the project data, compare the planning team indicator to a defined breaking point, and identify the project as complex when the planning team indicator falls on one side of the breaking point.

Some embodiments of a computer-readable medium store instructions that, when executed by a processor, cause the processor to identify at least one factor determinative of project complexity using historical project data for a plurality of completed projects. At least one of the completed projects has been determined to be complex based on its execution, and at least another of the completed projects has been determined to be not complex based on its execution. The medium stores further instructions that, when executed by the processor, cause the processor to the historical project data associated with one completed, complex project as proposed project data for the identified factors. The medium stores further instructions that, when executed by the processor, cause the processor to convert the input value to a scaled value for each factor; calculate an absolute score for each factor as a function of the scaled value, the minimum scale limit, the maximum scale limit, and the weighting coefficient for that factor; calculate a planning team indicator for a proposed project as a function of the proposed project data; compare the planning team indicator to a defined breaking point; identify the proposed project as complex when the planning team indicator falls on one side of the breaking point and as not complex when the planning team indicator falls to the other side of the breaking point; and iteratively adjust the weighting coefficients until the proposed project is identified as complex.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, in which like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

In embodiments of the present disclosure, computer implemented methods and computer implemented systems are provided for identifying high to very high complexity projects. By analyzing historical project data, factors that determine project complexity may be identified. For each identified factor, a range is defined that bounds the value of that factor over the expected range of projects. Also for each factor, a scale is associated with the value range. Based on the relative dominance of each factor in determining project complexity, a weighting coefficient is associated with each factor.

To determine if a particular project has high to very high complexity, a value for each factor is provided based on information related to the project. The value provided for each factor must fall within the value range for that factor. The input value for each factor is then converted to a scaled value that falls within the scale defined for that factor.

Using Technique for Order Preference by Similarity to Ideal Solution (TOPSIS) methodology, a positive ideal solution, a negative ideal solution, and an absolute index are calculated for each factor as a function of the input provided. In turn, these calculated parameters and the defined weighting coefficients for all factors are used to calculate a positive ideal solution, a negative ideal solution, and an absolute score, or planning team indicator (PTI), for the project.

The calculated PTI is used to identify high to very high complexity projects, which may then be divided into two or more smaller projects that may be more easily managed. For instance, a low threshold may be defined, such that a project having a PTI below the lower threshold is identified as complex. Once identified as complex, a planning team may be appointed to determine the best way to divide the complex project into two or more smaller projects that may be more easily managed. An upper threshold may also be defined, such that a project having a PTI above the upper threshold is not identified as complex, and thus need not be divided nor a planning team appointed. For a project having a PTI in between the two thresholds, the organization may make a "judgment call" as to whether, or not, to appoint a planning team and break up the project into smaller ones. Alternatively, the organization may appoint a planning team to determine whether to break up the project and if so, how.

While in the project development pipeline, a project may pass through a number of phases, such as a concept phase, an analysis phase, a design phase, a development phase, a testing phase, and a launch phase. The cycle time for the project may be defined as the length of time it takes for the project to pass through the development pipeline. The ability to predict the cycle time for a project may be useful for planning purposes (i.e., allocating the necessary resources for a particular phase). Cycle time may be determined as a function of a number of factors, including estimated project costs, the length of time needed for project analysis, the associated testing plan, organizational participation in the project, the number of applications impacted, and the pre-existing status of the project.

Moreover, projects in the development pipeline may be governed to various degrees to insure that the project is completed on time and within budget. However, governance actions that may be appropriate for one project may be inappropriate for another project. Taking governance actions when such actions are inappropriate may cause unnecessary delays and increased costs. Thus, the ability to optimize project governance is desirable.

In order to optimize project governance, it is necessary to predict when additional action should or should not be taken during a phase of project execution. Whether or not to take such action may be dependent on the complexity of the project, which in turn may be determined by a number of factors, including total estimated project cost, estimated vendor costs, the number of applications potentially impacted, and whether the project may impact the organization network, information technology billing, and/or customer equipment. In some instances, the same factors that may affect cycle time may also affect project complexity, and thus, may determine when governance action may or may not be necessary.

The underlying motivation for predicting cycle time and optimizing project governance may be the same—to maximize the efficient use of resources to execute projects in the development pipeline in the most cost effective manner and within the desired time frame. However, despite the best planning and optimal project governance, project execution may still exceed the allocated budget and run past the intended deadline. This may be particularly so when the project has high or very high complexity.

One way to avoid instances of budget and/or schedule overruns may be to divide the high or very high complexity project (hereinafter "complex project") into two or more smaller, more manageable projects that can be executed substantially independently of one another. Moreover, the earlier in the development pipeline a complex project may be identified, the sooner the project may be divided, thereby further reducing the potential for budget and/or schedule overruns.

The present disclosure is directed to systems and methods for identifying complex projects. In some embodiments, the disclosed methods utilize information generated during the concept phase of a project to calculate a planning team indicator (PTI), the value of which indicates whether the project may be complex and therefore should be broken into smaller, more manageable projects. Thus, the disclosed methods permit complex projects to be identified early in the development pipeline. Once a complex project is identified, the organization is then permitted an opportunity to divide the project into two or more smaller, more manageable projects that may be executed substantially independently of one another. Dividing projects into smaller projects may promote reduced project cost, efficient project execution, and may promote reducing the impact to other projects in the development pipeline.

Figure 1:
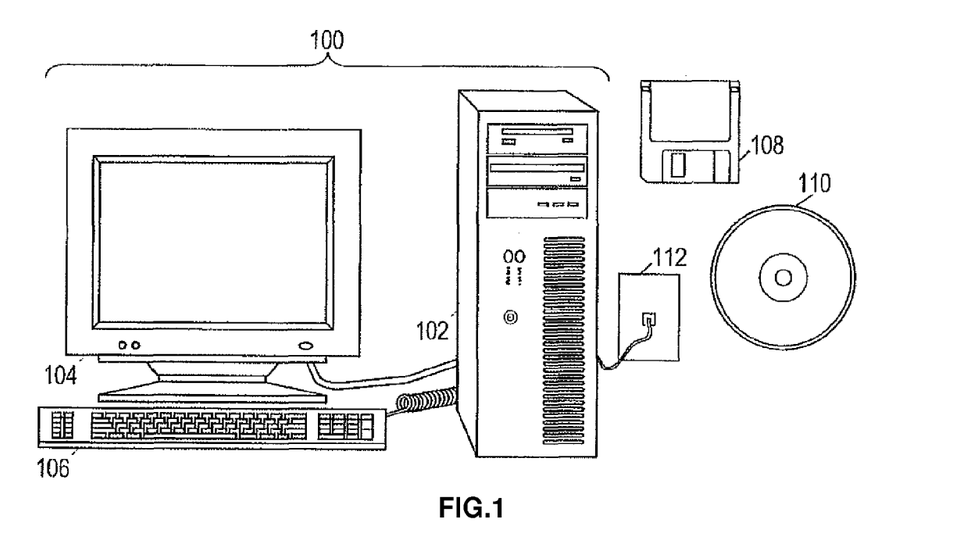
FIG. 1 is an illustrative computer system configured to implement the planning team indicator (PTI) methodology according to an embodiment of the disclosure.

Turning now to FIG. 1, an illustrative system 100 configured to implement the planning team indicator (PTI) methodology is depicted. As shown, system 100 is a desktop computer. However, other electronic devices having adequate computing power coupled to a user interface may be configured to carry out the methods disclosed herein. Among others, servers, portable computers, personal digital assistants (PDAs) and mobile phones may be configured to carry out aspects of the disclosed methods.

System 100 comprises chassis 102, display 104, and input device 106. Chassis 102 further comprises a processor, memory, and information storage devices. One or more of the information storage devices may store programs and data on removable storage media, such as floppy disk 108 or optical disc 110. The stored information may be used to calculate the PTI associated with a given project. Chassis 102 may further comprise a network interface that allows system 100 to receive information, such as PTI software and historical project data, via a wired or wireless network, represented in FIG. 1 by phone jack 112.

Chassis 102 is coupled to display 104 and input device 106 to interact with a user. Display 104 and input device 106 together operate as a user interface for enabling a user to calculate the PTI associated with a given project. Display 104 is shown as a video monitor, but may take many alternative forms, such as a printer, a speaker, or other means for communicating information to a user. Input device 106 is shown as a keyboard, but may similarly take many alternative forms, such as a button, a mouse, a keypad, a dial, a motion sensor, a camera, a microphone or other means for receiving information from a user. Information supplied by the user via input device 106 may include proposed project data. Both display 104 and input device 106 may be integrated into chassis 102.

Figure 2:
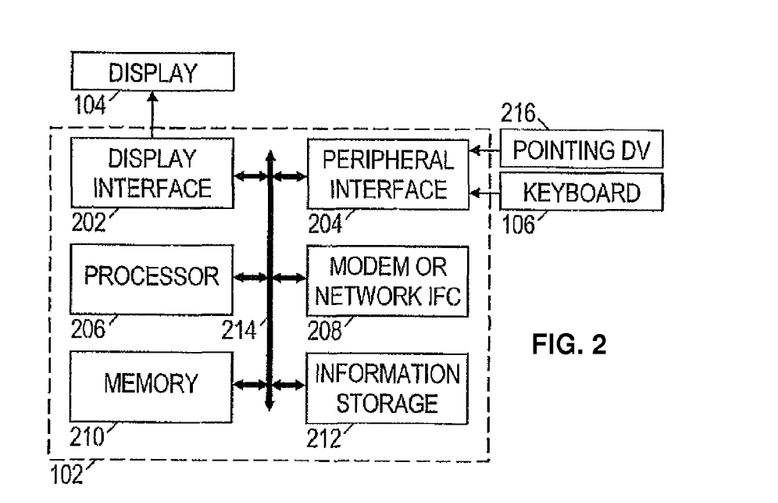
FIG. 2 shows a block diagram of a computer system according to an embodiment of the disclosure.

FIG. 2 shows a simplified functional block diagram of system 100. As shown, chassis 102 may comprise display interface 202, peripheral interface 204, processor 206, modem or other suitable network interface 208, memory 210, information storage device 212, and bus 214. System 100 may be a bus-based computer with bus 214 interconnecting the other elements and carrying communications between those elements. Display interface 202 may take the form of a video card or other suitable display interface that accepts information from bus 214 and transforms it into a form suitable for display 104. Conversely, peripheral interface 204 may accept signals from keyboard 106 and other input devices such as a pointing device 216, and transform them into a form suitable for communication on bus 214.

To carry out the PTI methodology disclosed herein, processor 206 gathers information from other system elements, including input data from peripheral interface 204, and program instructions and other data from memory 210, information storage device 212, or from a remote location via network interface 208. Processor 206 carries out the program instructions and processes the data accordingly. The program instructions may further configure processor 206 to send data to other system elements, including information communicated via display interface 202 and display 104 for the user.

Processor 206, and hence system 100 as a whole, may operate in accordance with one or more programs stored on information storage device 212 and/or the memory 210. Processor 206 may copy portions of the programs into memory 210 for faster access, and may switch between programs or carry out additional programs in response to user actuation of the input device. The additional programs may be retrieved from information storage device 212 or may be retrieved from remote locations via network interface 208. One or more of these programs configures system 100 to carry out at least one of the PTI methods disclosed herein.

Figure 3:
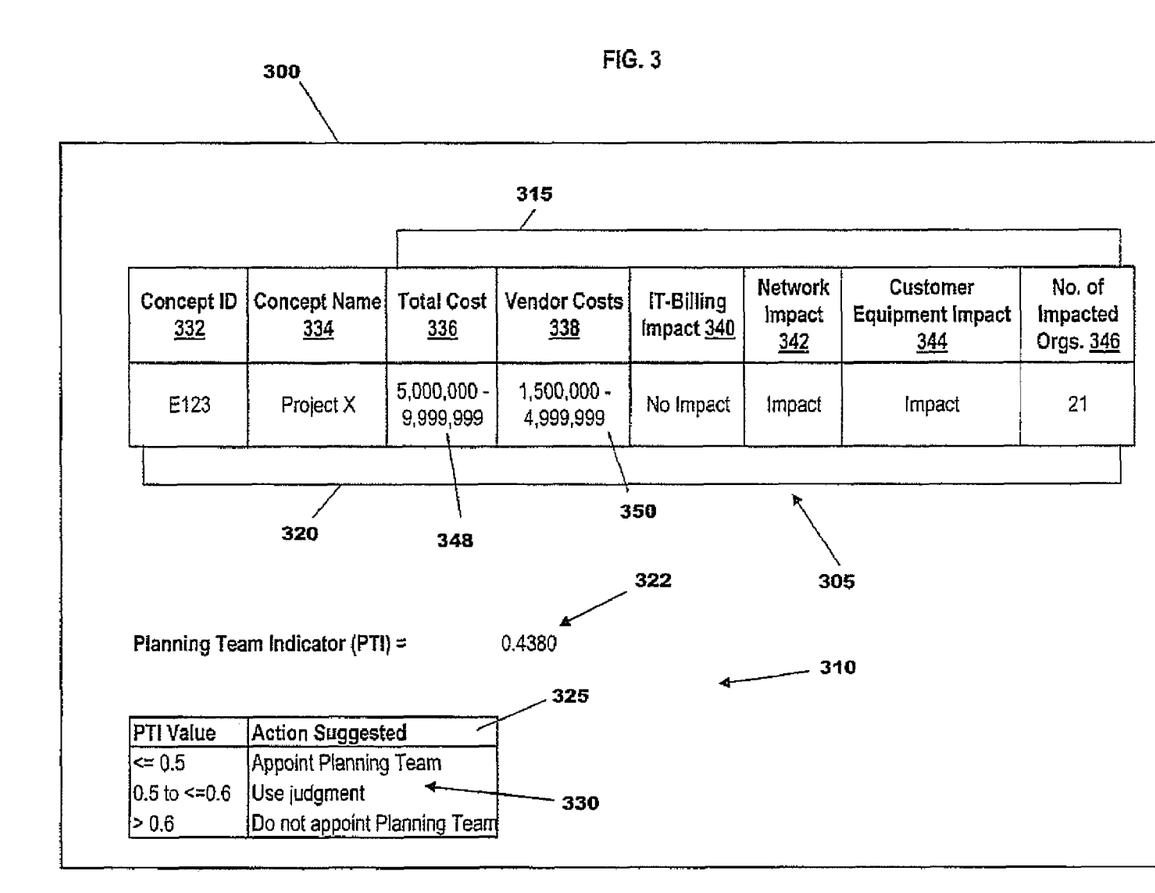
FIG. 3 illustrates a graphical user interface (GUI) for specifying select input used to calculate an associated PTI and for displaying information used to interpret the calculated PTI according to an embodiment of the disclosure.

FIG. 3 is an illustrative graphical user interface (GUI) 300 which may be displayed after a user accesses processor 206 via using keyboard 106 and display 104 and causes processor 206 to execute program instructions that embody the PTI methodology disclosed herein. In some embodiments, the program instructions may be included in a software tool, for example, an Excel spreadsheet. In such embodiments, a user may access the software tool, or PTI tool, using processor 206.

Upon accessing the PTI tool, the user may be allowed only limited access to a sheet(s), or a module(s), within the PTI tool depending upon the user's identity. For example, a typical user may be restricted to a single sheet, such as GUI 300, which allows the user to calculate a PTI for a given project as a function of user-defined input. In other instances, the user may be the software architect responsible for maintaining the PTI tool. That individual may have unlimited access to the PTI tool, including the ability to use the tool just as a typical user would and to modify the tool when needed.

In this illustration, the GUI 300 is a sheet within an Excel spreadsheet configured to calculate a PTI for a given project. In some embodiments, the GUI 300 comprises two regions, input region 305 and output region 310. In input region 305, the user provides values for select parameters, specifically "Concept ID" 332, "Concept Name" 334, and factors 315, by typing directly into the appropriate cells 320. In other embodiments of a PTI tool, the user may also define values for one or more of these parameters using drop-down menus.

"Concept ID" 332 and "Concept Name" 334 are simply an alphanumeric identifier and name, respectively, that identifies the project for which a PTI will be calculated. As shown in this illustration, the "Concept ID" 332 and "Concept Name" 334 are "E123" and "Project X", respectively. Factors 315 are one or more attributes that determine project complexity. In some embodiments, factors 315 may coincide with factors that determine cycle time and/or are used to optimize project governance. Values for factors 315 may be input in a number of different ways.

Values for factors 315 may be specified in terms of a range selected from one or more pre-defined ranges (i.e. "$5,000,000-$9,999,999" chosen from a list of ranges including "$0-$499,999," "$500,000-$1,499,999," "$1,500,000-$4,999,999," "$5,000,000-$9,999,999," and "$10,000,000 or higher." As shown, the input value for "Total Cost" 336 is "$5,000,000-$9,999,999." In some embodiments, the pre-defined ranges are hardcoded into the PTI tool by the software architect, and not provided as input by a typical user. Moreover, the pre-defined ranges may be randomly defined, defined for convenience, for instance, to have equal breadth, or defined using natural breakpoints identified by analysis of historical project data. For example, analysis of historical data may reveal that "$1,500,000" is a natural breakpoint for project cost, meaning projects having a total cost less than this value exhibit certain behavior while those projects having a total cost exceeding this value exhibit other, different behavior.

Values for factors 315 may be provided as a specific number falling within a pre-defined range (i.e. "21" chosen from a pre-defined range of "0 to 30"). Additionally, values for factors 315 may be selected from a fixed number of choices (i.e., "No Impact" chosen from a pre-defined list of choices comprising "Impact" and "No Impact").

In the illustrative GUI 300, "Total Cost" 336, "Vendor Costs" 338, "IT-Billing Impact" 340, "Network Impact" 342, "Customer Equipment Impact" 344, and "No. of Impacted Orgs." 346 are the factors 315. "Total Cost" 336 represents the total estimated cost for implementing a project. During the concept phase of the project, this cost 336 may be estimated and provided by the user in cell 348. "Vendor Costs" 338 are those costs attributed to outside vendors, meaning entities outside of the organization, during project execution. These "Vendor Costs" 338 are included in the input value for "Total Cost" 336. "No. of Impacted Orgs." 346 represents the number of organizations that will be impacted by a project (i.e. "21").

Often estimated project costs, particularly in the concept phase, are not broken down further. Thus, the fraction of the total project cost attributable to impacts of a project on IT-billing, the network, and/or customer equipment, referring to equipment provided by the organization to their customers, may not be available. As such, it may not be possible to define cost ranges for each of "IT-Billing Impact" 340, "Network Impact" 342, and "Customer Equipment Impact" 344, similar to that provided for "Vendor Costs" 338. Instead, those factors 315 may be designated as impacted or not impacted by a project using input values of "Impact" or "No Impact", as illustrated in GUI 300.

When input values for all factors 315 have been provided in cells 320, the PTI tool calculates a PTI 322 for the project using methods to be described below and displays the PTI 322 in the output region 310 of GUI 300. Table 325, located below PTI 322, provides information 330 for interpreting the value of PTI 322. For example, a PTI 322 that is less than or equal to 0.5 indicates that the project may be complex and suggests that a planning team should be appointed. A planning team may be defined as a group, consisting of at least one individual, whose functions include determining the best way to divide a complex project into two or more smaller projects. A PTI 322 that is greater than 0.6 indicates that the project may not be complex. Thus, the project need not be divided nor a planning team appointed. For a PTI 322 falling between those two ranges, the organization may make a "judgment call" as to whether, or not, to appoint a planning team and break up the project into smaller ones. Alternatively, the organization may appoint a planning team to determine whether to break up the project and if so, how.

Figure 4:
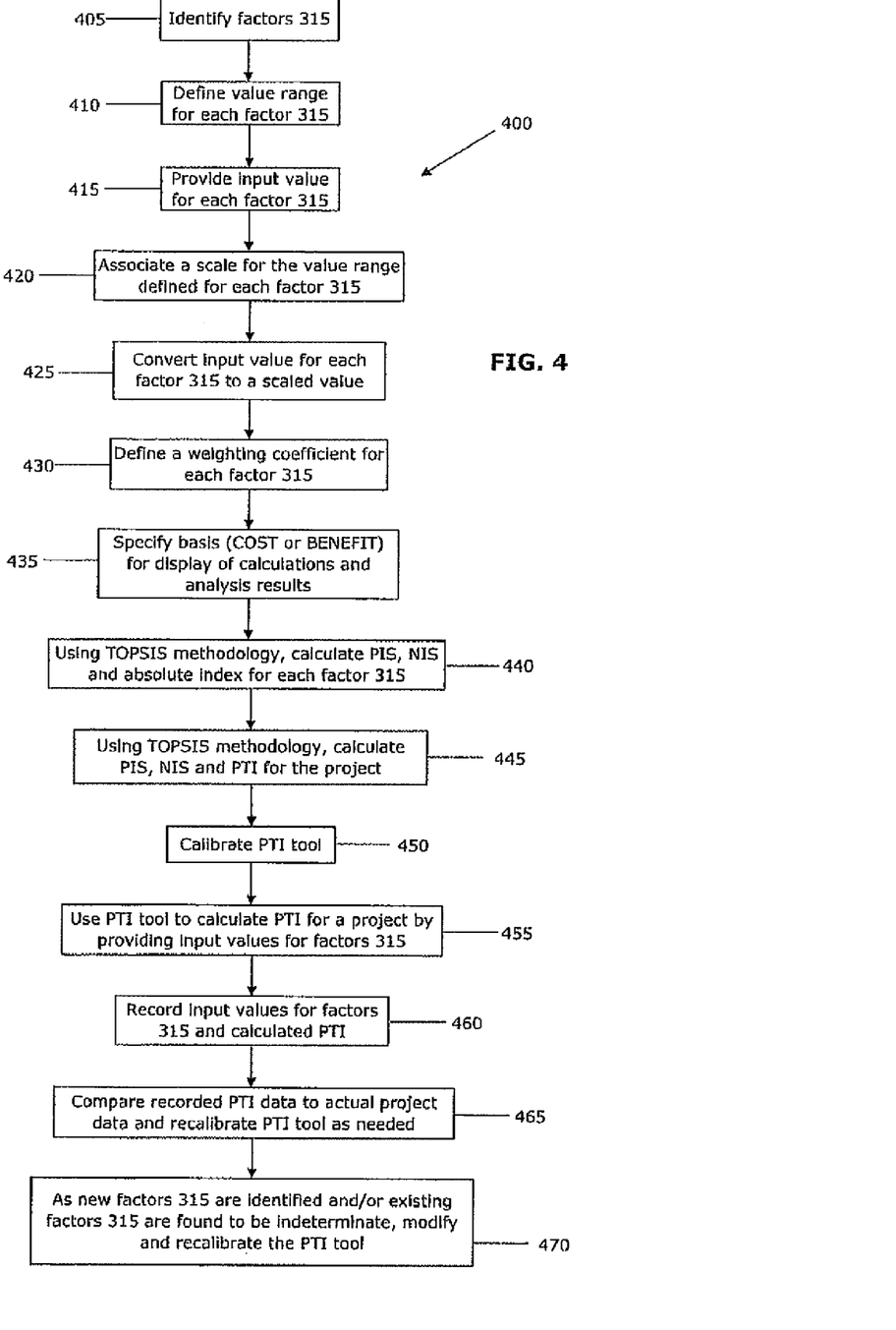
FIG. 4 is a logic diagram for an illustrative method of calculating a PTI according to an embodiment of the disclosure.

FIG. 4 is a logic diagram for an illustrative method 400 of calculating a PTI 322. The methodology depicted in this diagram includes not only the steps a typical user will exercise to calculate a PTI 322 for a particular project but also the steps for identifying factors 315 that determine project complexity and for interrelating input values associated with those factors 315 to determine the PTI 322 for the project. Moreover, this diagram is merely illustrative of one embodiment of the PTI methodology. In other method embodiments, the steps depicted in FIG. 4 may be performed in a different order.

The method embodied by FIG. 4 begins when factors 315 are identified. (block 405) As described earlier, factors 315 are one or more attributes that determine project complexity. Attributes that determine project complexity may be identified using a number of different techniques. One method is to employ statistical analysis using historical data. This approach consists of gathering historical data regarding a number of characteristics known to make a project more difficult to complete. The characteristics or attributes are viewed as independent variables associated with project complexity as part of a statistical analysis. Cycle time can be used to relate these attributes to project complexity. Statistical analysis may be performed using a multiple regression analysis method such as step-wise regression or backward elimination regression to reduce the overall set of attributes to those that are statistically significant. These statistically significant attributes may then be used as factors 315 to determine project complexity. Details on multiple regression analysis can be found in Berenson, M. L., Krehbiel, T. C., and Levine, D. M., *Basic Business Statistics: Concepts and Applications*. Upper Saddle River, N.J., Pearson/Prentice Hall, 2005, 8*th* Edition. p. 550-633. HF1017.B38 2001.

In the illustrative GUI 300 shown in FIG. 3, six factors 315 are identified, specifically, "Total Cost" 336, "Vendor Costs" 338, "IT-Billing Impact" 340, "Network Impact" 342, "Customer Equipment Impact" 344, and "No. of Impacted Orgs." 346.

Once all factors 315 are identified, a value range for each factor 315 is defined based on the expected range of projects to be evaluated using the PTI tool. (block 410) For example, and again referring to FIG. 3, the total number of organizations that may be impacted by the expected range of projects may equal 30. On the other hand, no organizations may be impacted. Therefore, the value range defined for "No. of Impacted Orgs." 346 is "0 to 30."

In order to calculate a PTI 322 for a given project, and thus determine whether the project is complex, an input value is provided for each factor 315 in cells 320, as described with respect to FIG. 3. (block 415) In some embodiments, the input values are assigned based on information gathered or calculated in the concept phase of the project. Each input value must fall within the value range (recall block 410) for each one of the associated factors 315. Continuing with the example presented above, the input value provided for "No. of Impacted Orgs." 346 must be in the range "0 to 30." At this step, the user may also define a "Concept ID" 332 and a "Concept Name 334" to uniquely identify the project associated with the input values and for which a PTI 322 is sought.

Since the input values for each of the factors 315 may often be rough estimates generated during the concept phase of the project, these values may be considerably different than the actual costs that will be incurred. Therefore, according to the methods disclosed herein, the relative input values of each of the factors 315 have more significance than their actual magnitudes. For instance, that "Vendor Costs" 338 are estimated to be ⅓ of the "Total Cost" 336 is more significant to the methods disclosed herein than the actual value estimated for "Vendor Costs" 338.

To permit a relative comparison of input values for each one of the factors 315, a scale is associated with the value range (recall block 410) for each one of the factors 315. (block 420) The scale is defined by a minimum limit and a maximum limit. The minimum limit of the scale is associated with one extreme of the value range, while the maximum limit is associated with the other extreme of the value range.

For example, the value range for "Total Cost" 336 may be defined as "$0 to $10,000,000." A scale of 1 to 5 may also be defined and associated with the value range for this factor 315. The minimum limit of the scale (e.g. "1") may be associated with the minimum extreme of the value range for "Total Cost" 336 (e.g. "$0"). Similarly, the maximum limit of the scale (e.g. "5") may be associated with the maximum extreme of the value range for "Total Cost" 336 (e.g. "$10,000,000").

Alternatively, the minimum limit of the scale may be associated with the maximum extreme of the value range, and the maximum limit of the scale may be associated with the minimum extreme of the value range. Although this example assumes a scale of "1 to 5," the scale may be defined as 1 to 10, 15 to 45, or any other preference.

Having defined a scale for each one of the factors 315, the input value (recall block 415) for each one of the factors 315 is converted to a scaled value falling within the defined scale for each one of the given factors 315. (block 425) To convert each input value (recall block 415), a relationship between the input value, the minimum and maximum scale limits (recall block 420), and the end points of the value range (recall 410)

is defined for each one of the factors 315. For each one of the factors 315, the defined relationship is used to convert the input value to a scaled value falling within the defined scale, meaning in the range defined by the minimum and maximum limits of the scale. In some embodiments, the scaled value of the input value may be calculated using linear interpolation. In other embodiments, a nonlinear relationship between these parameters may be used.

By way of example, assume that, for a particular project, the value range is "$0 to $10,000,000" for "Total Cost" 336, the defined scale is "1 to 5," and the input value for "Total Cost" 336 is "$2,000,000." The input value, meaning $2,000,000, may be converted to a scaled value falling within the range 1 to 5 by also assuming a relationship between the value range and the scale. In other words, the input value will be converted to a scaled value of 1, 2, 3, 4, or 5. Using linear interpolation and rounding to the nearest whole integer, the scaled value associated with the input value of $2,000,000 is "2", or ($2,000,000-$0)/($10,000,000-$0)*(5-1)+1.

Next, a weighting coefficient is defined for each one of the factors 315 depending on the relative dominance of the particular one of the factors 315 in determining project complexity. (block 430) For example, project complexity may be heavily affected by the total project cost while only marginally affected by impacts to customer equipment. As such, weighting coefficients of "35" and "5" may be defined for "Total Cost" 336 and "Customer Equipment Impact" 344, respectively. Values of the weighting coefficients may be thought of as percentages. However, in some method embodiments, it is not necessary that the sum of all weighting coefficients equal 100. In such embodiments, the PTI tool may be configured to convert the weighting coefficients to adjusted weighting coefficients, such that the sum of all adjusted weighting coefficients equals 100%.

The input defined and/or calculated by steps embodied in blocks 405 through 430 and results of calculations performed by the PTI tool in subsequent steps may be presented at least one of two ways. The user may specify the basis for which this information is presented. (block 435) In the illustrative method 400 depicted in FIG. 4, the user may select to present the information on the basis of "Cost" or "Benefit."

If the user selects the "Cost" basis, the minimum extreme of the value range (recall block 410) for each one of the factors 315 is associated with the minimum scale limit (recall block 420), and the maximum extreme of the value range is associated with the maximum scale limit. Alternatively, the user may select the "Benefit" basis. In that case, the minimum extreme of the value range for each one of the factors 315 is associated with the maximum scale limit, and the maximum extreme value of the value range is associated with the minimum scale limit.

Choosing between "Cost" basis and "Benefit" basis simply provides different ways to view defined input and calculation results generated by the PTI tool. For example, "Total Cost" 336 may have an associated scale of "1 to 5" and a value range of "$0 to $10,000,000." By selecting "Cost" basis, the minimum scale limit, meaning "1," is associated with the minimum extreme of the value range, or "$0." The maximum scale limit, meaning "5," is associated with the maximum extreme of the value range, or "$10,000,000."

Alternatively, the "Benefit" basis may be selected. As a result, the maximum scale limit, meaning "5," is associated with the minimum extreme of the value range, or "$0," and the minimum scale limit, meaning "1," is associated with the maximum extreme of the value range, or "$10,000,000."

In this manner, the maximum cost, or minimum benefit, of the value range for "Total Cost" 336 is associated with the maximum scale limit for that one of the factors 315. The minimum cost, or the maximum benefit, of the value range for "Total Cost" 336 is associated with the minimum scale limit for that one of the factors 315.

Figure 5:
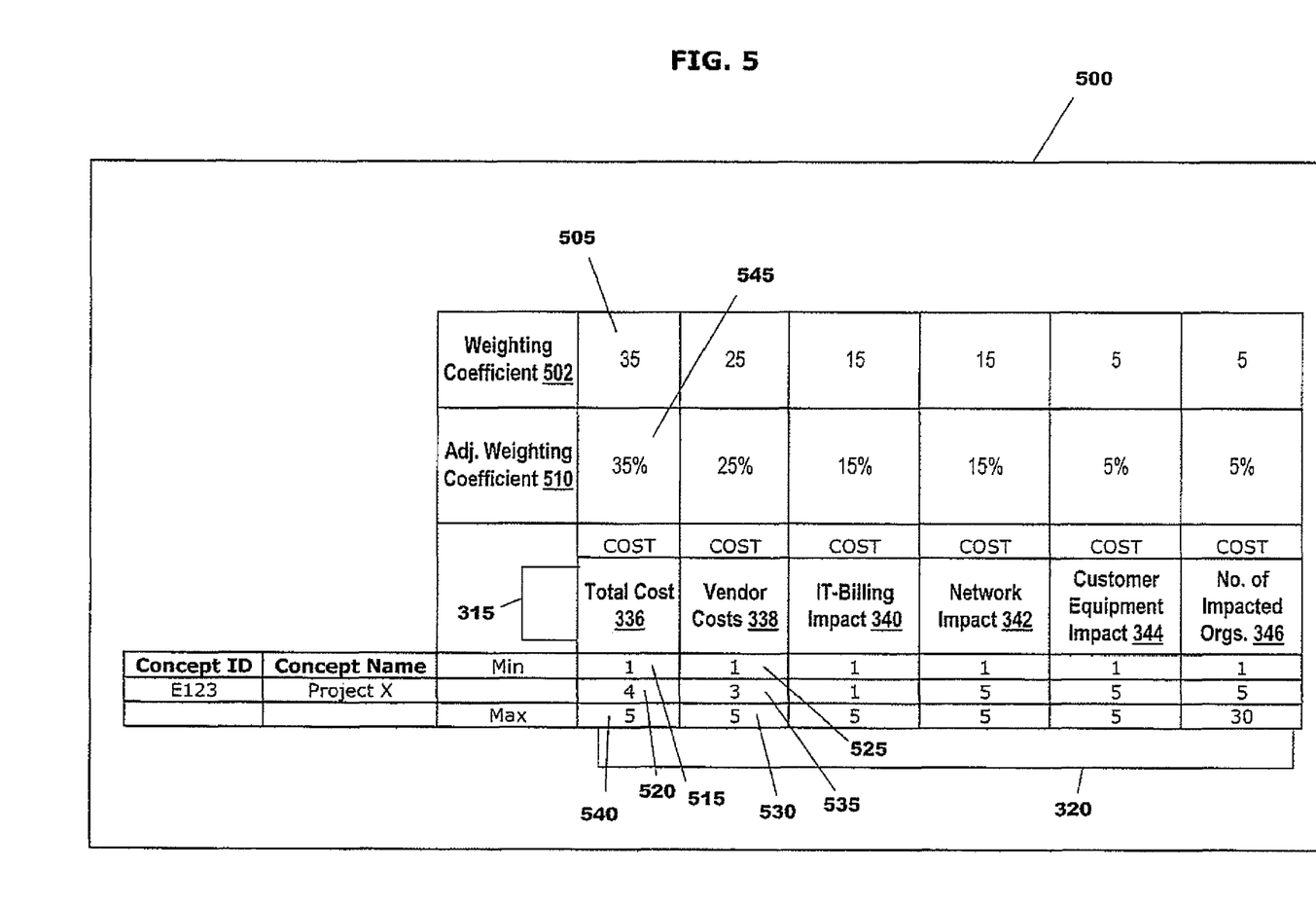
FIG. 5 illustrates a GUI for defining certain parameters used to calculate a PTI according to an embodiment of the disclosure.

At this point in method 400, all input needed by the PTI tool to calculate a PTI 322 for the project has been provided or defined. In accordance with some method embodiments, that input may be summarized in the form of a GUI to allow the user to verify the accuracy of input defined or provided. FIG. 5 depicts one such exemplary GUI which may be displayed by the PTI tool for this purpose. Some of the input defined in accordance with the steps embodied in blocks 405 through 435 of FIG. 4 is summarized in the various cells 320 that are shown in GUI 500. In addition, some of input needed by the PTI tool is defined using GUI 500, while the remainder of the input is defined in cells 320 not shown in GUI 500.

As shown in FIG. 5, the user may define weighting coefficients 502 for factors 315 (recall block 430). For example, a weighting coefficient of "35" has been defined in cell 505 for "Total Cost" 336. Using the defined weighting coefficients 502, the PTI tool calculates adjusted weighting coefficients 510, the sum of which equals 100%, and displays the adjusted weighting coefficients 510 below the weighting coefficients 502.

In this illustrative GUI 500, the "Cost" basis has been selected (recall block 435). Therefore, the maximum cost of the value range for "Total Cost" 336 (recall block 410) is associated with the maximum scale limit (recall block 420) for that one of the factors 315, or "5." The minimum cost of the value range for "Total Cost" 336 is associated with the minimum scale limit, or "1."

Had the "Benefit" basis been selected instead, the positions of "1" in cell 515 and "5" in cell 540 would be interchanged with one another. The minimum cost, or maximum benefit, of the value range for "Total Cost" 336 would then be associated with the maximum scale extreme, or "5." Also, maximum cost, or minimum benefit, of the value range for "Total Cost" 336 would then be associated with the minimum scale limit, or "1."

For each factor 315, the defined scale limits and the scaled value, calculated by the PTI tool (recall block 425) using the input value (recall block 415), are shown below each factor 315. For example, the minimum and maximum scale limits for "Vendor Costs" 338 are shown in cells 525 and 530, respectively. The scaled value of the input value for "Vendor Costs" 338 is displayed in cell 535 and, in this illustration, equals "3."

Returning to FIG. 4, the PTI tool next performs a number of calculations leading to a PTI 322 for the project using the input provided or defined in accordance with the steps described above in reference to blocks 400 through 435. The steps for performing these calculations are represented by blocks 440 and 445.

First, the PTI tool calculates an absolute index and two limits that bound the absolute index for each factor 315 using a Technique for Order Preference by Similarity to Ideal Solution (TOPSIS). (block 440) Details on TOPSIS can be found in Hwang, C. L. and Yoon, K. *Multiple Attribute Decision Making: Methods and Applications a state-of-the-art survey*. Berlin; New York: Springer-Verlag, 1981. T57.95 .H85, which is incorporated herein by reference for all purposes. The traditional TOPSIS method measures the Euclidian distance from the positive and negative ideal solutions to generate a relative index. In embodiments of the present disclosure, the PTI tool uses TOPSIS methodology to calculate upper and lower limits, as substitutes for the positive and negative ideal solutions, to force the generation of an absolute index for each factor 315.

More simply put, the TOPSIS methodology is one method for combining all of the input associated with each factor 315 to arrive at an absolute index for that factor 315 and a reference scale, defined by the positive and negative ideal solutions, which bounds the absolute index. Other methods that yield similar results may be used in place of TOPSIS. For instance, any of the following methods may be employed: Simple Additive Weights (SAW), Elimination and Choice Translating Reality (ELECTRE), Weighted Product Method, and Distance from Target Method.

Figure 6:
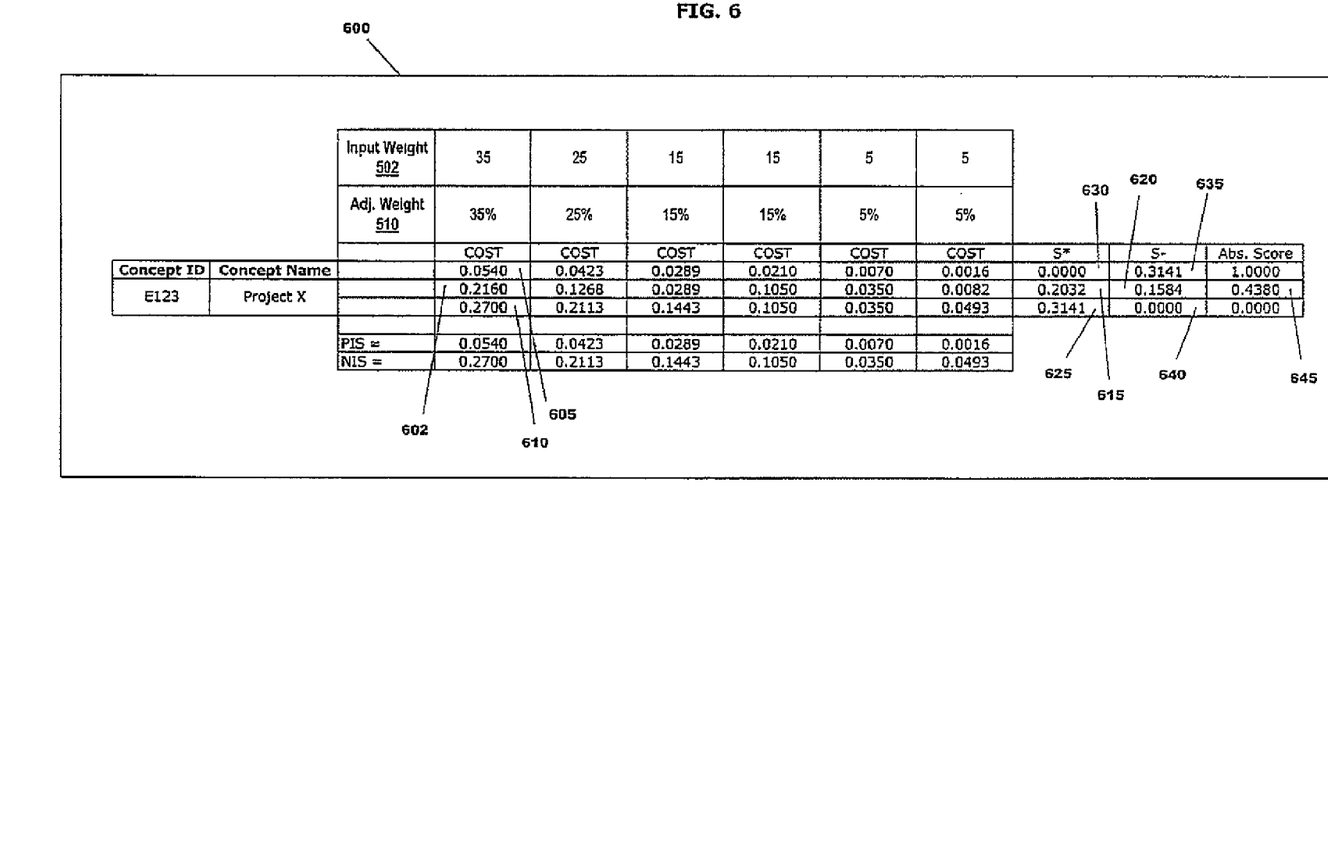
FIG. 6 illustrates a GUI for displaying calculations leading to an associated PTI according to an embodiment of the disclosure.

In accordance with some method embodiments, results from calculations represented by blocks 440 and 445 may be summarized in the form of a GUI to allow the user to view and check the results. FIG. 6 depicts one such illustrative GUI 600 that may be displayed by the PTI tool for these purposes. GUI 600 summarizes at least some of the calculations performed by the PTI tool using the methods illustrated by blocks 440 and 445 of FIG. 4. Referring to FIG. 6, the absolute index calculated for "Total Cost" 336 using TOPSIS methodology is shown in cell 602 and, in this illustration, equals "0.2160". This absolute index 602 is bounded by positive and negative ideal solutions shown in cells 605 and 610, respectively.

The following illustrate calculations (recall block 440) for the absolute index 602, the positive ideal solution 605, and negative ideal solution 610 using input displayed in GUI 500 of FIG. 5:

absolute index 602=scaled value/SQRT(max scale limit^2+scaled value^2+min scale limit^2)*adjusted weighting coefficient 545 positive ideal solution 605=min scale limit/SQRT (max scale limit^2+scaled value^2+min scale limit^2)*adjusted weighting coefficient 545 negative ideal solution 610=max scale limit/SQRT (max scale limit^2+scaled value^2+min scale limit^2)*adjusted weighting coefficient 545 where the scaled value of "Total Cost" 336, the minimum scale limit, the maximum scale limit, and the adjusted weighting coefficient 510 is found in cells 520, 515, 540, and 545, respectively, of FIG. 5.

The absolute index, positive ideal solution and negative ideal solution for all other factors 315 are calculated similarly.

Next, also following TOPSIS methodology, the PTI tool combines the positive ideal solution, the negative ideal solution, the absolute index, and the adjusted weighting coefficient 510 for each factor 315 to arrive at a positive ideal solution for the project 615 and a negative ideal solution for the project 620 (recall block 445). Each of these solutions 615, 620 may be evaluated in terms of calculated limits. Specifically, the positive ideal solution for the project 615 is bounded by upper and lower limits 625, 630. Similarly, the negative ideal solution for the project 620 is bounded by upper and lower limits 635, 640.

The following illustrate calculations for the positive ideal solution for the project 615 and its upper and lower limits, 625, 630:

positive ideal solution for the project 615=Σ(absolute index−positive ideal solution)^2 for all factors 315 lower limit 625=Σ(negative ideal solution−positive ideal solution)^2 for all factors 315 upper limit 630=Σ(positive ideal solution−positive ideal solution)^2 for all factors 315

The following illustrate calculations for the negative ideal solution for the project 620 and its upper and lower limits, 635, 640:

negative ideal solution for the project 620=Σ(absolute index−negative ideal solution)^2 for all factors 315 lower limit 640=Σ(negative ideal solution−negative ideal solution)^2 for all factors 315 upper limit 635=Σ(positive ideal solution−negative ideal solution)^2 for all factors 315

Finally, the PTI tool combines the positive and negative ideal solutions for the project 615, 620 and their respective upper and lower limits 625, 630, 635, 640 to yield an absolute score for the project 645 in a range defined as 0 to 1.0. The absolute score for the project 645 is also known as the PTI 322 for the project. The following illustrates the calculation for the absolute score for the project 645, or the PTI 322:

PTI 322=negative ideal solution for the project 620/ (negative ideal solution for the project 620+positive ideal solution for the project 615)

Returning to FIG. 4, the PTI tool is calibrated using historical project data to insure the accuracy of the PTI tool for identifying complex projects. (block 450) During the calibration process for at least some method embodiments, the weighting coefficients 500 are iteratively adjusted until the PTI tool calculates a PTI 322 less than 0.5, which identifies a project as complex, for 80% to 90% of completed projects characterized as complex based on historical data recorded for those completed projects. In other words, historical data for completed projects identified as complex based on their actual execution, not the PTI tool, is used as input to the PTI tool. The weighting coefficients 502 are iteratively adjusted so that the PTI tool identifies 80% to 90% of them as complex, meaning the PTI tool estimates a PTI 322 less than 0.5 for 80% to 90% of those projects.

In this illustrative method embodiment, "0.5" is selected as the PTI 322 value below which a project is identified as complex. In other method embodiments, that value, or breaking point, may be higher or lower than "0.5", and the PTI tool calibrated to the selected breaking point. In still other embodiments, the PTI tool may be calibrated to identify more or less than 80% to 90% of completed complex projects at a selected breaking point.

In other method embodiments, the weighting coefficients 502 may be iteratively adjusted until the PTI tool calculates a PTI 322 greater than 0.6, which indicates a project is not complex, for 80% to 90% of completed projects characterized as not complex based on historical data recorded for those completed projects. In still other method embodiments, the weighting coefficients 502 may be iteratively adjusted until the PTI tool accurately identifies, for example, at least 80% of projects as complex and at least 80% of projects as not complex based on historical data recorded for those completed projects.

Once calibration of the PTI tool is complete, the tool is ready for use. (block 455) A user may execute the PTI tool to calculate a PTI 322 for a particular project. As described above, the user accesses the PTI tool and defines input values for factors 315. The PTI tool then generates a PTI 322 for the project and information 330 for interpreting the PTI 322 so generated.

As the PTI tool is used, input values and the resulting PTI 322 may be recorded in association with a particular project. When that project is completed, actual data for each of the factors 315 may also be recorded. In this way, historical project data is compiled. (block 460) As historical project data accumulates, the historical project data may be used to periodically check the PTI tool accuracy and to recalibrate the tool if necessary in accordance with the methods described in reference to block 450. (block 465)

When new factors 315 are identified or existing factors 315 are found to be indeterminate, relatively speaking, of project complexity, the PTI tool may be modified to include or exclude factors 315 as appropriate. (block 470) In such instances, the PTI tool must be recalibrated following the steps described above in reference to block 450.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for identifying complex projects, comprising:
   receiving proposed project data for one or more factors including at least one of the group consisting of total project cost, total vendor costs, a number of organizations impacted, customer equipment impact, information technology billing impact, and network impact, wherein the data for each factor comprises an input value, a value range, a weighting coefficient, and a scale associated with the value range, wherein the scale has a minimum limit and a maximum limit;
   converting the input value to a scaled value for each factor;
   calculating, by planning team indicator software stored on a non-transitory computer readable medium and executed by a processor, an absolute score for each factor as a function of the scaled value, the minimum scale limit, the maximum scale limit, and the weighting coefficient for the factor, wherein the function is defined using Technique for Order Preference by Similarity to Ideal Solution (TOPSIS) methodology;
   calculating, by the planning team indicator software, an absolute score for a project associated with the proposed project data as a function of the absolute score for all factors;
   comparing, by the planning team indicator software, the absolute score for the project to a defined breaking point;
   identifying, by the planning team indicator software, the project as complex when the absolute score for the project falls on one side of the breaking point; and
   calibrating the planning team indicator software, wherein the calibrating comprises using historical project data of completed historical projects as the proposed project data and iteratively modifying the weighting coefficients until the absolute score for a threshold number of the historical projects falls on the one side of the breaking point.

2. The method of claim 1, wherein the converting comprises defining a relationship between the input value and the scaled value.

3. The method of claim 2, wherein the relationship is linear.

4. The method of claim 2, wherein the relationship is non-linear.

5. The method of claim 1, wherein the function between the absolute score for the project and the absolute scores for all factors is defined using TOPSIS methodology.

6. The method of claim 1, further comprising analyzing historical project data to identify the factors.

7. A computer implemented system for planning team indicator methodology, comprising:
   a first memory that stores the planning team indicator software;
   a processor that executes the planning team indicator software, wherein the planning team indicator software configures the processor to:
   receive proposed project data for identified factors, wherein the data for each of the identified factors comprises an input value, a value range, a weighting coefficient, and a scale associated with the value range, wherein the scale has a minimum limit and a maximum limit, and wherein the identified factors comprise at least four of the group consisting of: total project cost, total vendor costs, a number of organizations impacted, customer equipment impact, information technology billing impact, and network impact;
   convert the input value to a scaled value for each factor;
   calculate an absolute score for each factor as a function of the scaled value, the minimum scale limit, the maximum scale limit, and the weighting coefficient for the factor, wherein the function is defined using Technique for Order Preference by Similarity to Ideal Solution (TOPSIS) methodology;
   calculate a planning team indicator for a project associated with the proposed project data, the planning team indicator including an absolute score calculated as a function of the absolute score for all factors;
   compare the planning team indicator to a defined breaking point;
   identify the project as complex when the absolute score of the planning team indicator falls on one side of the breaking point; and
   calibrating the planning team indicator software, wherein the calibrating comprises using historical project data of completed historical projects as the proposed project data and iteratively modifying the weighting coefficients until the absolute score of the planning team indicator for a threshold number of the completed historical projects are identified as complex.

8. The computer implemented system of claim 7, further comprising a user interface configured to receive the project data and to display the planning team indicator.

9. The computer implemented system of claim 8, wherein the user interface is further configured to display information for interpreting the planning team indicator.

10. The computer implemented system of claim 7, further comprising a second memory that stores the project data.

11. The computer implemented system of claim 10, wherein the planning team indicator software further configures the processor to retrieve the project data from the second memory.

12. The computer implemented system of claim 10, wherein the planning team indicator software further configures the processor to store the project data and the planning team indicator in the second memory.

13. The computer implemented system of claim 7, wherein the function between the planning team indicator and the project data is defined using TOPSIS methodology.

14. The computer implemented system of claim 7, wherein the planning team indicator software further configures the processor to analyze the project data to identify the factors.

15. A computer-readable medium storing instructions that, when executed by a processor, cause the processor to:
   identify at least one factor determinative of project complexity using historical project data for a plurality of completed projects, wherein at least one of the completed projects has been determined to be complex based on its execution and at least another of the completed projects has been determined to be not complex based on its execution;
   receive the historical project data associated with each of a plurality of completed, complex projects as proposed project data for the identified factors, wherein the data for each factor comprises an input value, a value range, a weighting coefficient, and a scale associated with the value range, wherein the scale has a minimum limit and a maximum limit;
   convert the input value of the identified factors for each of the plurality of completed, complex projects to a scaled value for each of the identified factors;
   calculate for each of the plurality of completed, complex projects an absolute score for each factor as a function of the scaled value, the minimum scale limit, the maximum scale limit, and the weighting coefficient for the identified factor, wherein the function is defined using Technique for Order Preference by Similarity to Ideal Solution (TOPSIS) methodology;
   calculate a planning team indicator for each of the plurality of completed, complex projects, the planning team indicator including an absolute score calculated as a function of the absolute score for all of the identified factors for a completed, complex project;
   compare the absolute score of the planning team indicator for each of the plurality of completed, complex projects to a defined breaking point;
   identify, for each of the plurality of completed, complex projects, a corresponding completed, complex project as complex when the absolute score of the planning team indicator falls on one side of the breaking point and as not complex when the absolute score of the planning team indicator falls to the other side of the breaking point; and
   iteratively adjust the weighting coefficients until a threshold number of the plurality of completed, complex projects are identified as complex.

16. The computer-readable medium of claim 15, further comprising instructions that, when executed by the process, cause the processor to:
   receive the historical project data associated with one completed but not complex project as the proposed project data; and
   iteratively adjust the weighting coefficients until the proposed project is identified as not complex.

17. The computer-readable medium of claim 15, further comprising instructions that, when executed by the processor, cause the processor to store the planning team indicator in association with the historical project data.

18. The computer-readable medium of claim 15, further comprising instructions that, when executed by the processor, cause the processor to retrieve the historical project data.

* * * * *